United States Patent
Zhu

(10) Patent No.: US 10,462,056 B2
(45) Date of Patent: Oct. 29, 2019

(54) DATA PACKET FORWARDING METHOD, NETWORK ADAPTER, HOST DEVICE, AND COMPUTER SYSTEM

(71) Applicant: Huawei Technologies Co., Ltd., Shenzhen (CN)

(72) Inventor: Wangyong Zhu, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 99 days.

(21) Appl. No.: 15/870,080

(22) Filed: Jan. 12, 2018

(65) Prior Publication Data

US 2018/0212875 A1    Jul. 26, 2018

Related U.S. Application Data

(63) Continuation of application No. PCT/CN2017/071951, filed on Jan. 20, 2017.

(51) Int. Cl.
*H04L 12/741*    (2013.01)
*H04L 12/46*    (2006.01)
(Continued)

(52) U.S. Cl.
CPC ............ *H04L 45/745* (2013.01); *G06F 9/455* (2013.01); *H04L 12/4641* (2013.01);
(Continued)

(58) Field of Classification Search
CPC ... H04L 45/745; H04L 12/4641; H04L 47/20; H04L 47/22; H04L 45/54; H04L 49/3027;
(Continued)

(56) References Cited

U.S. PATENT DOCUMENTS

2009/0055831 A1    2/2009    Bauman et al.
2010/0014526 A1*   1/2010    Chavan ............. H04L 12/467
                                                370/395.53
(Continued)

FOREIGN PATENT DOCUMENTS

CN    102932174 A    2/2013
CN    102946366 A    2/2013
(Continued)

OTHER PUBLICATIONS

"Cisco CSR 1000v Series Cloud Services Router Software Configuration Guide", Cisco Systems, Inc., XP055495301, pp. 1-35, California, San Jose (Updated Nov. 30, 2016).
(Continued)

*Primary Examiner* — Ricky Q Ngo
*Assistant Examiner* — Michael K Phillips
(74) *Attorney, Agent, or Firm* — Leydig, Voit & Mayer, Ltd.

(57) ABSTRACT

A data packet forwarding method, a network adapter and a host device. The method is applied to a network adapter, the network adapter is connected to a host device, the host device includes a first VM, the first VM includes N vNICs, and the network adapter includes a first VF allocated to the first VM, where N is an integer greater than 1. The method includes: receiving mapping relationship information sent by the host device, where the mapping relationship information is used to indicate a one-to-one mapping relationship between N queue pairs among queues configured for the first VF and the N vNICs, and each of the N queue pairs is used to forward a data packet of a vNIC corresponding to each queue pair; recording the mapping relationship information in a forwarding information table; and forwarding data packets of the N vNICs according to the mapping relationship information.

17 Claims, 10 Drawing Sheets

(51) Int. Cl.
  *H04L 12/813* (2013.01)
  *G06F 9/455* (2018.01)
  *H04L 12/815* (2013.01)
  *H04L 12/935* (2013.01)

(52) U.S. Cl.
  CPC .............. *H04L 45/54* (2013.01); *H04L 47/20* (2013.01); *H04L 47/22* (2013.01); *H04L 49/3027* (2013.01)

(58) Field of Classification Search
  CPC ... H04L 12/64; H04L 49/358; H04L 41/0803; H04L 49/90; G06F 9/455; G06F 9/45558; G06F 9/46; G06F 2009/45579; G06F 9/45533; G06F 9/5077
  See application file for complete search history.

(56) References Cited

U.S. PATENT DOCUMENTS

| | | | | |
|---|---|---|---|---|
| 2011/0103389 | A1* | 5/2011 | Kidambi | H04L 45/586 370/395.1 |
| 2013/0016731 | A1* | 1/2013 | Johnsen | H04L 12/1836 370/401 |
| 2013/0124702 | A1 | 5/2013 | Shah et al. | |
| 2013/0152075 | A1 | 6/2013 | Cardona et al. | |
| 2014/0122675 | A1* | 5/2014 | Cohen | H04L 12/413 709/223 |
| 2014/0185616 | A1* | 7/2014 | Bloch | G06F 9/45533 370/392 |
| 2015/0207678 | A1 | 7/2015 | Li et al. | |
| 2015/0215207 | A1 | 7/2015 | Qin et al. | |
| 2015/0263887 | A1* | 9/2015 | Sajeepa | H04L 41/0803 709/220 |
| 2016/0182342 | A1* | 6/2016 | Singaravelu | H04L 43/16 370/253 |

FOREIGN PATENT DOCUMENTS

| | | |
|---|---|---|
| CN | 103414535 A | 11/2013 |
| CN | 103621026 A | 3/2014 |

OTHER PUBLICATIONS

"Single Root I/O Virtualization and Sharing Specification Revision 1.1," pp. 1-90, PCI-SIG (Jan. 20, 2010).

"PCI-SIG SR-IOV Primer," An Introduction to SR-I OV Technology, Intel LAN Access Division, XP055573248, pp. 1-26 (Jan. 1, 2011).

"Huawei FusionSphere 6.0, Technical White Paper on Virtualization," Huawei Technologies Co., Ltd, Shenzhen, China, Issue 01, XP055573256, pp. 1-58 (Apr. 15, 2016).

Dredge "Accelerating the NFV Data Plane: SR-IOV and DPDK . . . in my own words," Metaswitch, XP055573333, pp. 1-14 (Dec. 31, 2015).

* cited by examiner

DATA PACKET FORWARDING METHOD, NETWORK ADAPTER, HOST DEVICE, AND COMPUTER SYSTEM

CROSS-REFERENCE TO RELATED APPLICATIONS

This application is a continuation of International Application No. PCT/CN2017/071951, filed on Jan. 20, 2017, the disclosure of which is hereby incorporated by reference in its entirety.

TECHNICAL FIELD

This application relates to the field of virtualization technologies, and more specifically, to a data packet forwarding method, a network adapter, a host device, and a computer system.

BACKGROUND

A virtualization technology can be used to simulate one or more virtual machines (VM) on a host device (the host device may also be referred to as a computer device, a physical host, or a physical computer). A VM may work like a host device. For example, a user may install an operating system and an application program on the VM. For another example, a user may access a network resource by using the VM. For a user, the VM may be considered as an application program running on the host device, but for an application program running on the VM, the VM provides an operating environment for the application program just like a real host device.

A single-root input/output virtualization (SRIOV) technology allows multiple VMs to efficiently share a peripheral component interconnect express (PCIe) device. The SRIOV introduces concepts of a physical function (PF) and a virtual function (VF) to support virtualization of a network adapter (or referred to as a network interface card, a physical network card, or a physical network interface card). The PF is a PCI function supported by the network adapter and may be extended as several VFs. The VF is an instance obtained by means of virtualization by an SRIOV-supported network adapter. A bandwidth resource for data transmission is configured for each VF of the network adapter. Each VF is allocated by a virtual machine monitor (VMM) to the VM running on the host device.

Inside the network adapter, a virtual switch function is provided and a bandwidth limiting function can be provided by using the PF/VF. A user (or an administrator) can allocate a bandwidth to each VF by using the bandwidth limiting function. In the prior art, one VF is corresponding to one virtual network interface card (vNIC), and therefore, the bandwidth resource allocated to each VF is exclusively used by one vNIC and cannot be shared among multiple vNICs.

SUMMARY

This application provides a data packet forwarding method, a network adapter, a host device, and a computer system, to allow a bandwidth resource to be shared among vNICs of a same VM.

According to one aspect, this application provides a data packet forwarding method. The method is applied to a network adapter, the network adapter is connected to a host device, the host device includes a first VM (or a first VM runs on the host device), the first VM includes N vNICs, and the network adapter includes a first VF allocated to the first VM, where N is an integer greater than 1. The method includes: receiving mapping relationship information sent by the host device, where the mapping relationship information is used to indicate a one-to-one mapping relationship between N queue pairs among queues configured for the first VF and the N vNICs, and each of the N queue pairs is used to forward a data packet of a vNIC corresponding to each queue pair; recording the mapping relationship information in a forwarding information table of the network adapter; and forwarding data packets of the N vNICs according to the mapping relationship information recorded in the forwarding information table.

The one-to-one mapping relationship is established between the N queue pairs of the first VF and the N vNICs of the first VM, such that the data packets of the N vNICs are all forwarded by using queue pairs of the first VF. Because the network adapter allocates a bandwidth resource on a basis of a VF, the N vNICs can share a bandwidth resource of the first VF.

In a possible design, the mapping relationship information records an identifier of each of the N vNICs, an identifier of a VF corresponding to each vNIC, and an identifier of a queue pair corresponding to each vNIC.

In a possible design, the forwarding data packets of the N vNICs according to the mapping relationship information recorded in the forwarding information table includes: receiving a first data packet, where the first data packet is a data packet sent to a first vNIC of the N vNICs, and the first data packet includes an identifier of the first vNIC; determining, by querying for the mapping relationship information in the forwarding information table according to the identifier of the first vNIC, a target receiving queue that is of the first VF and that is corresponding to the first vNIC; obtaining control information of the target receiving queue from PCI memory space of the first VF; and sending, according to the control information of the target receiving queue, the first data packet to the first vNIC by using the target receiving queue.

In a possible design, the identifier of each of the N vNICs includes a MAC address and a VLAN identifier of each vNIC.

In a possible design, the method further includes: receiving first indication information from a PF driver of the network adapter before the first VM is started, where the first indication information is used to indicate that a quantity of queue pairs that need to be started for the first VF is N; and sending second indication information to a driver of the first VF during a process of starting the first VM, where the second indication information is used to indicate that a quantity of queue pairs started for the first VF is N, so as to trigger the driver of the first VF to create N vNICs.

In the prior art, one VF driver creates only one vNIC. In this solution, the driver of the first VF can create a corresponding quantity of vNICs according to the quantity of queue pairs started for the first VF. Therefore, this solution is more flexible than the prior art.

In a possible design, the method further includes: receiving rate limiting policy information from the PF driver of the network adapter, where the rate limiting policy information is used to indicate an overall rate limiting policy for the N vNICs of the first VM; and configuring, according to the overall rate limiting policy, a bandwidth resource corresponding to the first VF.

In the prior art, one VF is corresponding to only one vNIC, and therefore, a rate limiting policy specific to only one vNIC can be formulated. In this solution, the bandwidth resource of the first VF is shared among the N vNICs, and therefore, an overall rate limiting policy specific to the N vNICs can be formulated. This enriches types of rate limiting policies.

In a possible design, the N vNICs are all vNICs of the first VM.

A correspondence between queue pairs of the first VF and all vNICs of the first VM is established, such that one VF can serve one VM and all vNICs of the VM can share a bandwidth resource of a same VF.

In a possible design, the N vNICs are all vNICs of the first VM, and the method further includes: receiving rate limiting policy information specific to the first VM from the PF driver of the network adapter; and configuring, according to the rate limiting policy information specific to the first VM, the bandwidth resource corresponding to the first VF.

VM-specific rate limiting policy information is formulated, such that the types of rate limiting policies are further enriched.

According to another aspect, this application provides a data packet forwarding method. The method is applied to a host device, the host device is connected to a network adapter, the host device includes a first VM, the first VM includes N vNICs, and the network adapter includes a first VF allocated to the first VM, where N is an integer greater than 1. The method includes: obtaining mapping relationship information, where the mapping relationship information is used to indicate a one-to-one mapping relationship between N queue pairs among queues configured for the first VF and the N vNICs, and each of the N queue pairs is used to forward a data packet of a vNIC corresponding to each queue pair; and sending the mapping relationship information to the network adapter, such that the network adapter records the mapping relationship information in a forwarding information table of the network adapter.

The one-to-one mapping relationship is established between the N queue pairs of the first VF and the N vNICs of the first VM, such that data packets of the N vNICs are all forwarded by using queue pairs of the first VF. Because the network adapter allocates a bandwidth resource on a basis of a VF, the N vNICs can share a bandwidth resource of the first VF.

In a possible design, the mapping relationship information records an identifier of each of the N vNICs, an identifier of a VF corresponding to each vNIC, and an identifier of a queue pair corresponding to each vNIC.

In a possible design, the identifier of each of the N vNICs includes a MAC address and a VLAN identifier of each vNIC.

In a possible design, the method further includes: before the first VM is started, sending first indication information to the network adapter by using a PF driver of the network adapter, where the first indication information is used to indicate that a quantity of queue pairs that need to be started for the first VF is N; and during a process of starting the first VM, receiving second indication information sent to a driver of the first VF by the network adapter, where the second indication information is used to indicate that a quantity of queue pairs started for the first VF is N, so as to trigger the driver of the first VF to create N vNICs.

In the prior art, one VF driver creates only one vNIC. In this solution, the driver of the first VF can create a corresponding quantity of vNICs according to the quantity of queue pairs started for the first VF. Therefore, this solution is more flexible than the prior art.

In a possible design, the method further includes: sending rate limiting policy information to the network adapter by using the PF driver of the network adapter, where the rate limiting policy information is used to indicate an overall rate limiting policy for the N vNICs of the first VM.

In the prior art, one VF is corresponding to only one vNIC, and therefore, a rate limiting policy specific to only one vNIC can be formulated. In this solution, the bandwidth resource of the first VF is shared among the N vNICs, and therefore, an overall rate limiting policy specific to the N vNICs can be formulated. This enriches types of rate limiting policies.

In a possible design, the N vNICs are all vNICs of the first VM.

A correspondence between queue pairs of the first VF and all vNICs of the first VM is established, such that all vNICs of a VM can share a bandwidth resource of a same VF.

In a possible design, the N vNICs are all vNICs of the first VM, and the method further includes: receiving rate limiting policy information specific to the first VM from the PF driver of the network adapter; and configuring, according to the rate limiting policy information specific to the first VM, a bandwidth resource corresponding to the first VF.

VM-specific rate limiting policy information is formulated, such that the types of rate limiting policies are further enriched.

According to another aspect, this application provides a network adapter, including modules configured to execute the method that is applied to the network adapter and that is provided in some of the foregoing aspects.

According to another aspect, this application provides a host device, including modules configured to execute the method that is applied to the host device and that is provided in some of the foregoing aspects.

According to another aspect, this application provides a network adapter, including a memory and a processor, where the memory is configured to store program code, and the processor is configured to execute the program code stored in the memory, so as to perform an operation corresponding to the method that is applied to the network adapter and that is provided in some of the foregoing aspects.

According to another aspect, this application provides a host device, including a memory and a processor, where the memory is configured to store program code, and the processor is configured to execute the program code stored in the memory, so as to perform an operation corresponding to the method that is applied to the host device and that is provided in some of the foregoing aspects.

According to another aspect, this application provides a computer readable medium, where the computer readable medium stores program code to be executed by a network adapter, and the program code includes an instruction for executing the method that is applied to the network adapter and that is provided in some of the foregoing aspects.

According to another aspect, this application provides a computer readable medium, where the computer readable medium stores program code to be executed by a host device, and the program code includes an instruction for executing the method that is applied to the host device and that is provided in some of the foregoing aspects.

According to another aspect, this application provides a computer system, including the network adapter and the host device provided in some of the foregoing aspects.

In conclusion, in this application, the one-to-one mapping relationship is established between the N queue pairs of the first VF and the N vNICs of the first VM, such that a bandwidth resource is shared among multiple vNICs.

DESCRIPTION OF EMBODIMENTS

The following clearly describes the technical solutions in the embodiments of the present disclosure with reference to the accompanying drawings in the embodiments of the present disclosure.

It should be understood that all network adapters mentioned in this specification are network adapters that support an SRIOV technology. A network adapter of this type may also be referred to as an SRIOV network adapter.

Figure 1:
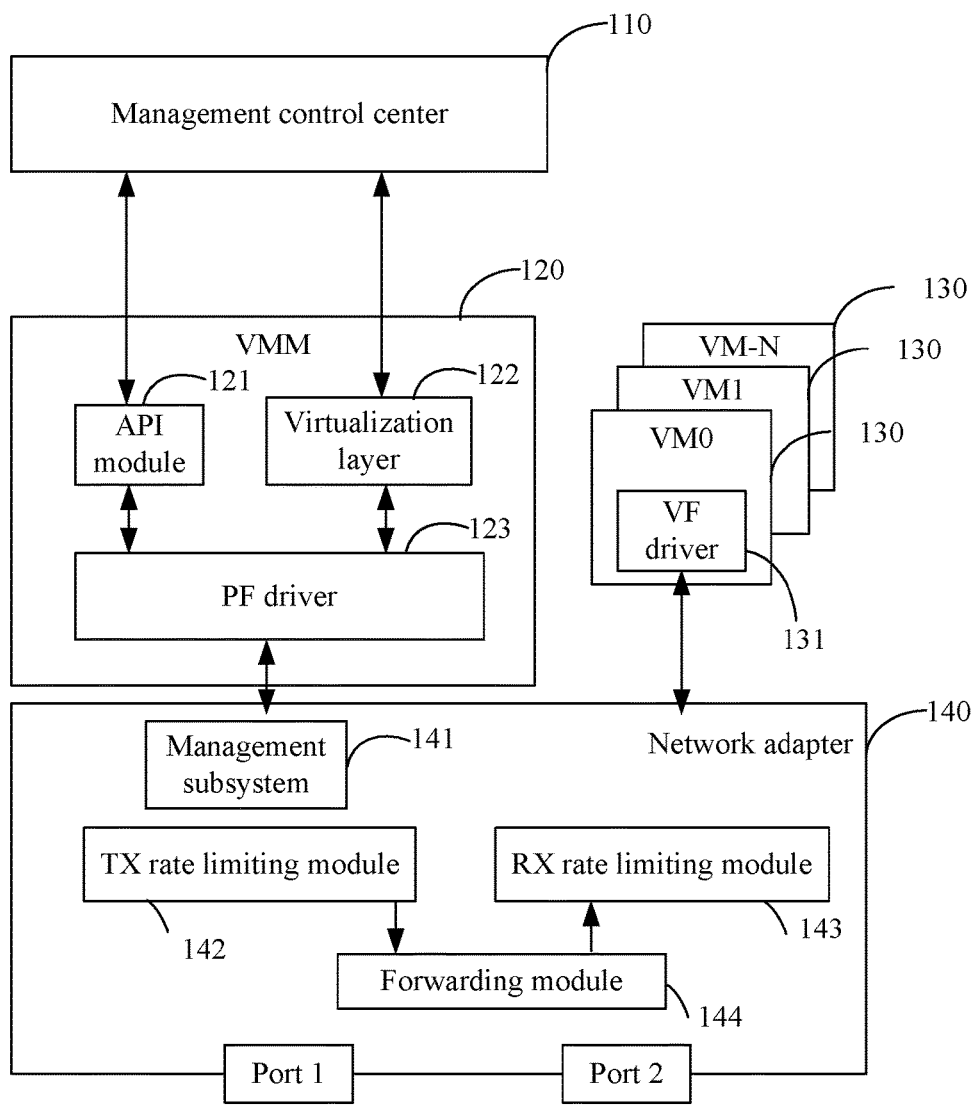
FIG. 1 is a schematic diagram of a virtualization system.

As shown in FIG. 1, a virtualization system generally includes a management control center 110, a VMM 120, one or more VMs 130, a network adapter 140, and the like.

The management control center 110 may manage and control the entire virtualization system and deliver various instructions or policies.

The VMM 120 may include an application programming interface (API) module 121, a virtualization layer 122, and a PF driver 123. A user may create a VM by using the virtualization layer 122. Further, the user may interact with the PF driver by using the API module 121, invoke a related interface of the PF driver to create a VF, and allocate the created VF to a corresponding VM.

The VM 130 may work like a real computer. For example, an application program and an operating system may be installed on the VM 130. In addition, the VM 130 may include a VF driver 131. The VM 130 may create a vNIC by using the VF driver 131. Assuming that the VF driver 131 is corresponding to a VF1 of the network adapter 140, a data packet of the vNIC created by the VF driver 131 may be transmitted by using a bandwidth resource corresponding to the VF1.

The network adapter 140 includes a PF and a VF. The PF is a PCI function supported by the network adapter and may be extended as several VFs. A VF is an instance (instance) obtained by means of virtualization performed by an SRIOV-supported network adapter. A bandwidth resource for data transmission is configured for each VF of the network adapter. Each VF is allocated by the VMM to the VM running on the host device.

Further, the network adapter 140 may include a management subsystem 141 that may be used to interact with the PF driver and the VF driver. The management subsystem 141 may be, for example, a central processing unit (CPU) or another type of processing unit.

The network adapter 140 may further include a TX rate limiting module 142, an RX rate limiting module 143, and a forwarding module 144. The TX rate limiting module 142 may be a module in a hardware form. The TX rate limiting module 142 may be configured to limit a rate of traffic in a TX direction. The TX direction is a direction from a vNIC to outside (another vNIC of a same host device or another host device). The RX rate limiting module 143 may be a module in a hardware form. The RX rate limiting module 143 may be configured to limit a rate of traffic in an RX direction. The RX direction is a direction from the outside to a vNIC. The forwarding module 144 may be a module in a hardware form. The forwarding module 144 may include a forwarding information table. The network adapter may forward, based on the forwarding information table in the forwarding module 144, a data packet between different host devices or between different vNICs of a same host device.

It should be noted that in FIG. 1, the VMM 120 and the VM 130 may run on a host device connected to the network adapter 140, and the management control center 110 may run on the host device or another host device.

Figure 2:
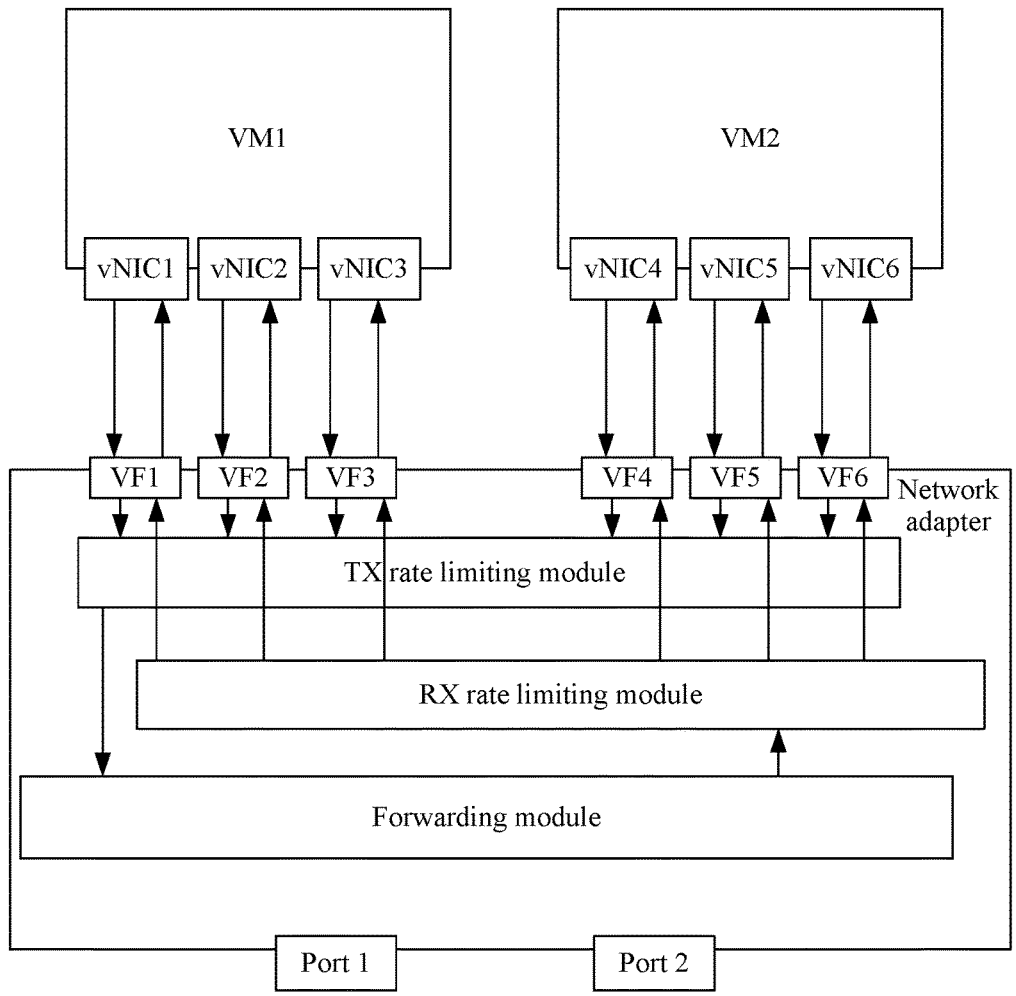
FIG. 2 is a schematic diagram of a correspondence between a VF of a network adapter and vNICs of a VM.

In the prior art, generally, multiple vNICs may be configured (or created) for one VM. Correspondingly, a network adapter configures one VF for each of the multiple vNICs. Referring to FIG. 2, a vNIC1, a vNIC2, and a vNIC3 are configured for a VM1. Correspondingly, a VF1, a VF2, and a VF3 are configured for the network adapter, and are corresponding to the vNIC1, the vNIC2, and the vNIC3 of the VM1 respectively. Likewise, a vNIC4, a vNIC5, and a vNIC6 are configured for a VM2, and a VF4, a VF5, and a VF6 are configured for the network adapter, and are corresponding to the vNIC4, the vNIC5, and the vNIC6 of the VM2 respectively.

Each VF of the network adapter has independent PCI configuration space (or PCIe configuration space) and PCI memory space (the PCI memory space may also be referred to as PCIe memory space or BAR space). The PCI memory space of the VF stores control information of a queue pair, and the network adapter may forward, according to the control information of the queue pair, a data packet of a vNIC corresponding to the VF. The VF1 in FIG. 2 is used as an example. When creating the VF1, the network adapter configures a queue pair for the VF1 to forward a data packet of the vNIC1. The queue pair includes a sending queue (SQ) and a receiving queue (RQ). Control information of the SQ and the RQ is stored in PCI memory space of the VF1. During a process of forwarding the data packet of the vNIC1, the network adapter obtains the control information of the SQ and the RQ from the PCI memory space of the VF1, and controls, based on the control information of the SQ and the RQ, the process of forwarding the data packet of the vNIC1. In addition, when a large quantity of data packets need to be forwarded, the queue pair may be further used to buffer the data packets to be forwarded. The following describes in detail the process of forwarding the data packet of the vNIC1 with reference to FIG. 3.

Figure 3:
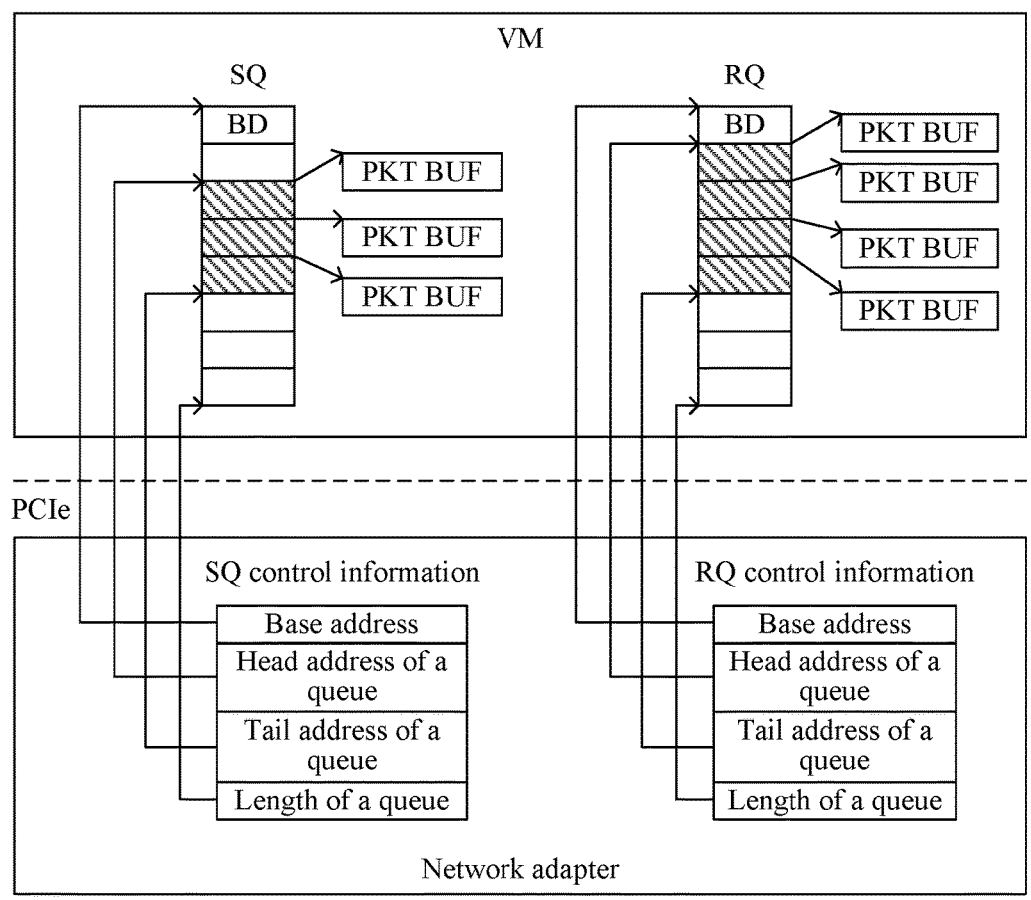
FIG. 3 is an example diagram of a queue-based data packet access manner.

As shown in FIG. 3, the SQ is used as an example. A network adapter side is mainly used to store the control information of the SQ (which is specifically stored in PCI memory space of a VF). The control information of the SQ includes a base address of the queue, a head address of the queue, a tail address of the queue, and a length of the queue. A host device side is mainly used to store the SQ and a data packet. Referring to FIG. 3, each storage unit of the SQ is configured to store a buffer descriptor (BD). The BD includes information about a data packet, such as a storage location of the data packet in a memory of the host device and a size of the data packet (PKT BUF in FIG. 3 represents the memory in which the data packet is stored, and a location of the memory is described or indicated by the BD). When a data packet of a vNIC corresponding to the VF needs to be forwarded to another VM of the same host device or another host device, the network adapter first reads the control information of the SQ from the PCI memory space of the VF, and reads a BD from a queue head of the SQ according to the control information of the SQ. Then, the network adapter parses the BD to obtain a storage location of the to-be-forwarded data packet in the memory of the host device. Next, the network adapter obtains the to-be-forwarded data packet from the memory by means of direct memory access (DMA), and forwards the to-be-forwarded data packet. A processing process of the RQ is approximately similar to that of the SQ, except that instead of reading a data packet from the memory of the host device by means of DMA, the network adapter needs to store the data packet in the memory of the host device by means of DMA and update a BD in a queue tail of the RQ. To avoid repetition, details are not described herein again.

In the prior art, the network adapter configures one or multiple queue pairs for each VF. Each VF serves only one vNIC, that is, queue pairs of each VF are used to forward a data packet of only one vNIC, and there is a one-to-one correspondence between a VF and a vNIC.

Inside the network adapter, a virtual switch function is provided and a bandwidth limiting function can be provided by using the PF/VF. A user may allocate a bandwidth resource to each VF by using the bandwidth limiting function. Bandwidth is an amount of data transmitted per unit of time, for example, a quantity of data packets that can be transmitted within one second. A bandwidth resource of each VF may be bandwidth occupied by a data packet forwarded by using queue pairs of each VF, such as average bandwidth, peak bandwidth, or burst bandwidth. A rate limiting manner based on a token bucket technology is used as an example. The bandwidth resource of each VF may be controlled according to a token bucket type and a token quantity that are allocated to each VF by a rate limiting module of the network adapter. Each VF is corresponding to one vNIC, and therefore, bandwidth allocated to each VF is exclusively used by one vNIC and the bandwidth resource cannot be shared among multiple vNICs.

Figure 4:
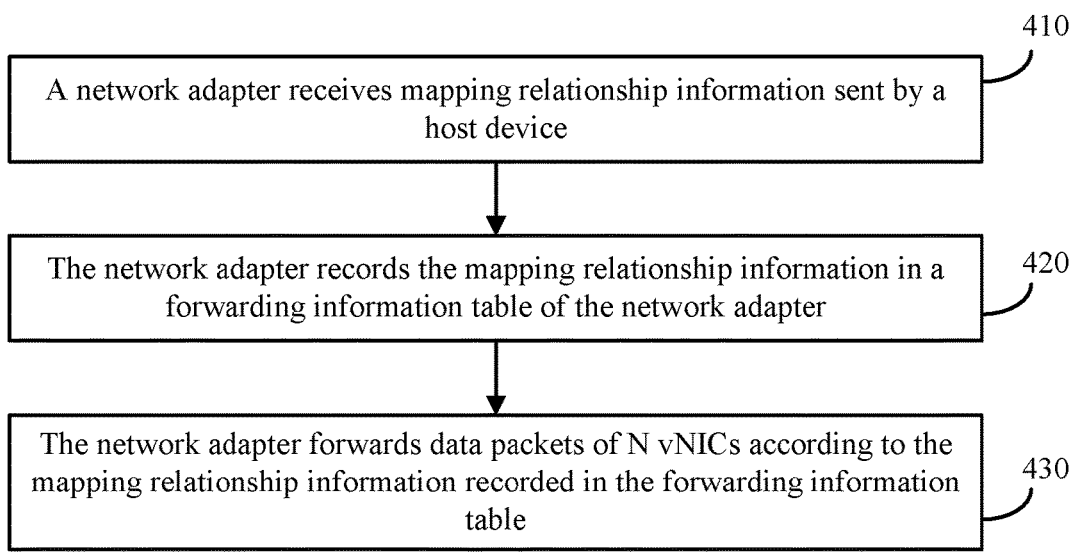
FIG. 4 is a schematic flowchart of a data packet forwarding method according to an embodiment of the present disclosure.

To resolve the foregoing technical problem, the following describes in detail a method embodiment of the present disclosure with reference to FIG. 4.

FIG. 4 is a schematic flowchart of a data packet forwarding method according to an embodiment of the present disclosure. The method in FIG. 4 may be applied to a network adapter. Alternatively, the method in FIG. 4 may be implemented by a network adapter. Specifically, the network adapter may be connected to a host device (which may be, for example, a server). The host device includes a first VM, and the first VM may include N vNICs, where N is an integer greater than 1. The network adapter includes a first VF allocated to the first VM. A specific allocation process may be implemented by a VMM on the host device. It should be understood that the network adapter (including a network adapter or a virtual network adapter) in this embodiment of the present disclosure may also be referred to as a network interface card.

The method in FIG. 4 includes the following steps.

410. The network adapter receives mapping relationship information sent by the host device, where the mapping relationship information is used to indicate a one-to-one mapping relationship between N queue pairs among queues configured for the first VF and the N vNICs, and each of the N queue pairs is used to forward a data packet of a vNIC corresponding to each queue pair.

Specifically, as shown in FIG. 1, the mapping relationship information may be generated by the management control center 110 at an upper layer and delivered to the forwarding module 144 of the network adapter by using a driver of the first VM running on the host device.

It should be noted that during a process of creating the first VF, the network adapter configures X queue pairs for the first VF (X is a positive integer not less than N). In this embodiment of the present disclosure, any N of the X queue pairs can be enabled (or started) to forward data packets of the N vNICs of the first VM. X represents a maximum quantity of queue pairs that can be configured for the first VF (that is, a maximum quantity of configurable queue pairs). X may be a system default value, and the system default value may be pre-stored in the management subsystem 141 shown in FIG. 1.

It should also be noted that a data packet of a vNIC may be a data packet that is sent to the vNIC or a data packet that needs to be forwarded by the vNIC. In some embodiments, the data packet of the vNIC may be a data packet whose destination address is a MAC address of the vNIC and/or may be a data packet whose source address is the MAC address of the vNIC.

420. The network adapter records the mapping relationship information in a forwarding information table of the network adapter.

430. The network adapter forwards data packets of the N vNICs according to the mapping relationship information recorded in the forwarding information table.

The network adapter includes the forwarding information table that is used to record the mapping relationship information. As shown in FIG. 1, the network adapter 140 includes the forwarding module 144, and the forwarding module 144 forwards a data packet based on the mapping relationship information recorded in the forwarding information table.

In the prior art, one VF is corresponding to one vNIC, and therefore, queue pairs of the VF are used to forward a data packet of only one vNIC. In comparison with the prior art, in this embodiment of the present disclosure, the one-to-one mapping relationship is established between the N queue pairs of the first VF and the N vNICs of the first VM. That is, queue pairs of the first VF may be used to forward the data packets of the N vNICs. Further, in this embodiment of the present disclosure, the mapping relationship information is stored in the forwarding information table of the network adapter. When the data packets of the N vNICs need to be forwarded based on the forwarding information table provided in this embodiment of the present disclosure, the data packets of the N vNICs are all forwarded by using the queue pairs of the first VF. Because the network adapter allocates a bandwidth resource on a basis of a VF, the N vNICs can share a bandwidth resource of the first VF.

The N vNICs may be some or all vNICs of the first VM, and this is not specifically limited in this embodiment of the present disclosure.

In some embodiments, the N vNICs may be all vNICs of the first VM, and it is equivalent that the first VF serves the entire first VM and all the vNICs of the first VM can share the bandwidth resource of the first VF.

Figure 5:
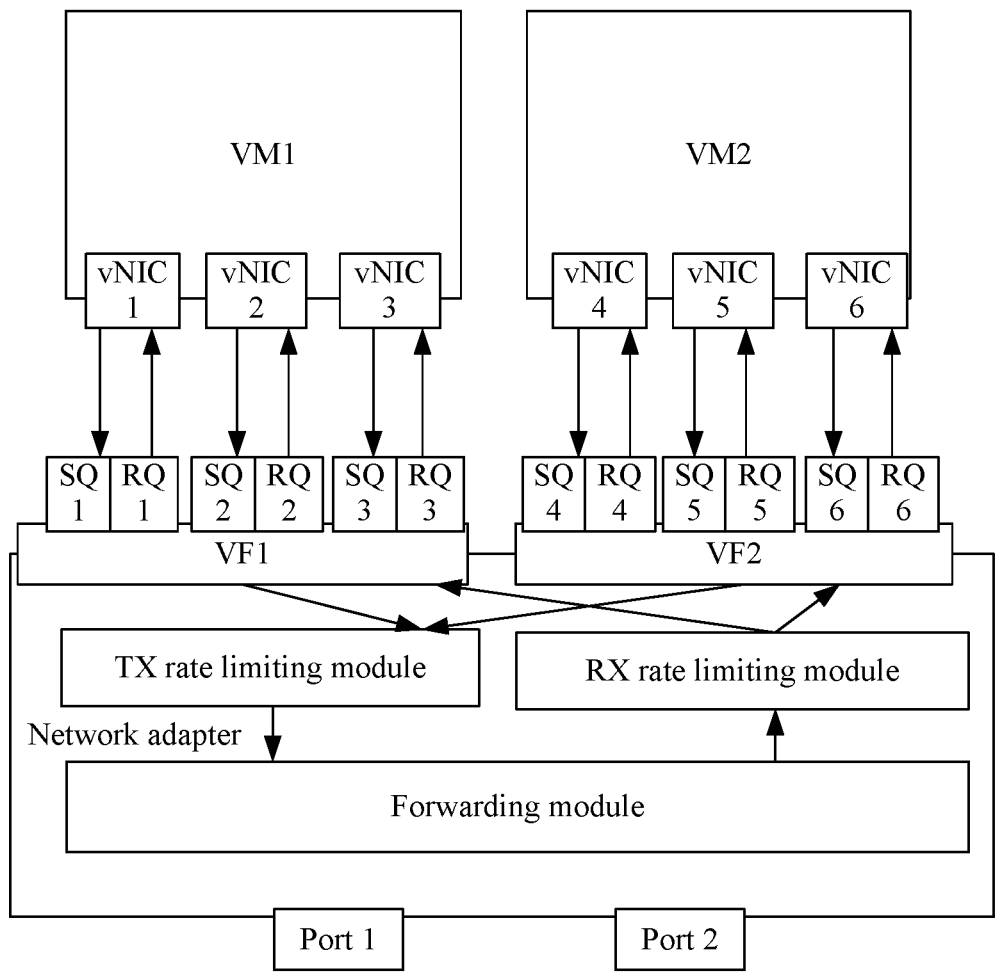
FIG. 5 is a schematic diagram of a correspondence between a VF of a network adapter and vNICs of a VM according to an embodiment of the present disclosure.

Using FIG. 5 as an example, the above-mentioned first VM may be either a VM1 or a VM2 in FIG. 5. It is assumed that the first VM is the VM1, the first VF is a VF1 in FIG. 5, and the VM1 includes three vNICs: a vNIC1, a vNIC2, and a vNIC3. A sending queue SQ1 and a receiving queue RQ1 that are responsible for forwarding a data packet of the vNIC1, a sending queue SQ2 and a receiving queue RQ2 that are responsible for forwarding a data packet of the vNIC2, and a sending queue SQ3 and a receiving queue RQ3 that are responsible for forwarding a data packet of the vNIC3 are configured for the VF1. Therefore, it is equivalent that the VF1 serves the entire VM1 instead of serving only one vNIC as described in the prior art. In this case, all the three vNICs of the VM1 can share a bandwidth resource of the VF1.

It should be noted that FIG. 5 illustrates an example in which one VF is corresponding to all vNICs of a VM, but this is not limited in this embodiment of the present disclosure. In some embodiments, the VF1 in FIG. 5 may be corresponding to some vNICs of the VM1. For example, the VF1 is corresponding to only the vNIC1 and the vNIC2 of the VM1. In this case, during establishment of a correspondence between queue pairs of the VF1 and vNICs of the VM1, only a correspondence between the vNIC1 and the SQ1/RQ1 and a correspondence between the vNIC2 and the SQ2/RQ2 need to be established, but a correspondence between the vNIC3 and the SQ3/RQ3 does not need to be established.

It should also be noted that FIG. 5 illustrates only an example in which the VM1 (or the VM2) includes three vNICs. Actually, the VM1 may include two, four, or even more vNICs.

In this embodiment of the present disclosure, content of the mapping relationship information is not specifically limited provided that a queue pair corresponding to a data packet to be sent or to be received can be found based on the mapping relationship information.

Optionally, in some embodiments, the mapping relationship information may record an identifier of each of the N vNICs, an identifier of a VF corresponding to each vNIC, and an identifier of a queue pair corresponding to each vNIC. Further, in some embodiments, the identifier of each of the N vNICs may include a Media Access Control (MAC) address and a virtual local area network (VLAN) identifier of each vNIC.

In some embodiments, the mapping relationship information may be expressed in a table form, and in this case, the mapping relationship information may also be called a mapping relationship table. Table 1 is an example of the mapping relationship table. Each line of Table 1 records a MAC address and a VLAN identifier of a vNIC, an identifier of a VF corresponding to the vNIC, and an identifier of a queue pair (including a sending queue and a receiving queue) corresponding to the vNIC.

TABLE 1

Example of mapping relationship information

| MAC address | VLAN identifier | VF identifier | Queue identifier |
|---|---|---|---|
| 00:11:22:33:44:55 | 0 | 1 | 0 |
| 00:11:22:33:44:66 | 1 | 1 | 1 |
| 00:11:22:33:44:77 | 2 | 1 | 2 |
| 00:11:22:33:55:55 | 0 | 2 | 0 |
| 00:11:22:33:55:66 | 1 | 2 | 1 |

Optionally, in some embodiments, the method in FIG. 4 may further include: before the first VM is started, receiving, by the network adapter (which may be specifically a management subsystem of the network adapter), first indication information from a PF driver of the network adapter, where the first indication information is used to indicate that a quantity of queue pairs that need to be started for the first VF is N; and during a process of starting the first VM, sending, by the network adapter (which may be specifically the management subsystem of the network adapter), second indication information to a driver of the first VF running on the first VM, where the second indication information is used to indicate that a quantity of queue pairs started for the first VF is N, so as to trigger the driver of the first VF to create N vNICs.

For example, in FIG. 1, before the first VM is started, a user (or an administrator) may operate the management control center 110 and configure, by using the API module 121 of the VMM 120, a quantity M of vNICs required by the first VM (where M is a positive integer greater than or equal to N). Then, the API module 121 may send the first indication information to the management subsystem 141 of the network adapter according to the quantity of vNICs required by the first VM, so as to instruct the first VF to start or enable N queue pairs. Each of the N queue pairs may be corresponding to one vNIC. The management subsystem 141 may record the quantity N of queue pairs started for the first VF. During a process of loading the driver of the first VF, the management subsystem 141 of the network adapter 140 sends the second indication information to the driver of the first VF, and the driver of the first VF creates the N vNICs according to the second indication information.

In the prior art, one VF is corresponding to one vNIC, and therefore, the driver of the first VF directly creates one vNIC during the process of starting the first VM. Different from the prior art, in this embodiment of the present disclosure, the first VF is corresponding to multiple vNICs of the first VM. Therefore, during the process of starting the first VM, the driver of the first VF may learn, from the network adapter (which may be specifically the management subsystem of the network adapter), the quantity of queue pairs started for the first VF, so as to learn a quantity of vNICs that need to be created by the driver of the first VF, and then create vNICs of the corresponding quantity.

Optionally, in some embodiments, step 430 may include: receiving a first data packet, where the first data packet is a data packet sent to a first vNIC of the N vNICs, and the first data packet includes an identifier of the first vNIC; determining, by querying for the mapping relationship information in the forwarding information table according to the identifier of the first vNIC, a target receiving queue that is of the first VF and that is corresponding to the first vNIC; obtaining control information of the target receiving queue from PCI memory space of the first VF; and sending, according to the control information of the target receiving queue, the first data packet to the first vNIC by using the target receiving queue. (A data packet may be stored at a corresponding location in a memory of the host device by means of DMA according to control information of a queue, and then the data packet is sent or received. For specific information thereof, refer to related descriptions of FIG. 3. Details are not described herein again.)

The mapping relationship information may be used for a data packet exchange between different VMs of a same host device, or a data packet exchange between a VM and another host device. Table 1 is used as an example. Assuming that the network adapter receives a data packet 1, and a MAC address and a VLAN identifier of the data packet 1 are 00:11:22:33:55:66 and 1 respectively, the network adapter can find, by searching Table 1, a VF identifier 2 (referred to as a VF2 below) and a queue pair identifier 1 (referred to as a queue pair 1 below) that are corresponding to the MAC address and the VLAN identifier. Then, the network adapter can obtain control information of an RQ in the queue pair 1 from PCI memory space of the VF2, and forward, according to the control information of the RQ, the data packet 1 to a vNIC corresponding to the queue pair 1.

A bandwidth limitation function of the network adapter is designed for a VF/PF. Therefore, the bandwidth limitation function can be implemented by adjusting bandwidth corresponding to the VF. As described above, in the prior art, one VF is corresponding to one vNIC, and therefore, limiting bandwidth of a VF is equivalent to limiting a rate of traffic of one vNIC. In this case, a cloud computing vendor may provide only vNIC-based rate limiting and charging policies, which are too simple to meet diversified needs. In this embodiment of the present disclosure, each VF may be corresponding to multiple vNICs of a VM, and therefore, limiting bandwidth of a VF is equivalent to limiting a rate of overall traffic of multiple vNICs of a VM. In this case, the cloud computing vendor may formulate rate limiting and charging policies for overall traffic of multiple vNICs, such that the rate limiting and charging policies are more flexible and diversified.

In some embodiments, the method in FIG. 4 may further include: receiving, by the network adapter (which may be specifically the management subsystem of the network adapter), rate limiting policy information from the PF driver of the network adapter, where the rate limiting policy information may be used to indicate an overall rate limiting policy for the N vNICs of the first VM; and configuring, by the network adapter (which may be specifically the management subsystem of the network adapter) according to the overall rate limiting policy, a bandwidth resource corresponding to the first VF.

Specifically, before or after the first VM is started, the user may deliver the rate limiting policy information by operating the management control center. As shown in FIG. 1, the user may send the rate limiting policy information to the PF driver 123 by using the API module 121, and then send the rate limiting policy information to the management subsystem 141 by using the PF driver 123. The management subsystem 141 may store various configuration parameters in the rate limiting policy information, and perform rate limiting by using the TX rate limiting module 142 and the RX rate limiting module 143.

A specific rate limiting manner may be rate limitation based on a token bucket technology. For example, a double-rate and double-bucket algorithm is used to control the TX rate limiting module and the RX rate limiting module in a hardware form to perform rate limiting. For a rate limiting manner based on the token bucket technology, refer to the prior art. Details are not described herein.

A type of information in the rate limiting policy information and a form of the rate limiting policy information are not specifically limited in this embodiment of the present disclosure. For example, the rate limiting policy information may include at least one of rate limiting policy information specific to a TX direction or rate limiting policy information specific to an RX direction. The rate limiting policy information specific to the TX direction may include at least one of following information: a committed information rate (CIR), average bandwidth, a peak information rate (PIR), peak bandwidth, a peak burst size (PBS), burst traffic, or the like. The rate limiting policy information specific to the RX direction may include at least one of the following information: average bandwidth, peak bandwidth, or burst bandwidth.

Optionally, in some embodiments, the N vNICs may be all vNICs of the first VM. In this case, the cloud computing vendor may formulate rate limiting and charging policies for overall traffic of the first VM.

Figure 6:
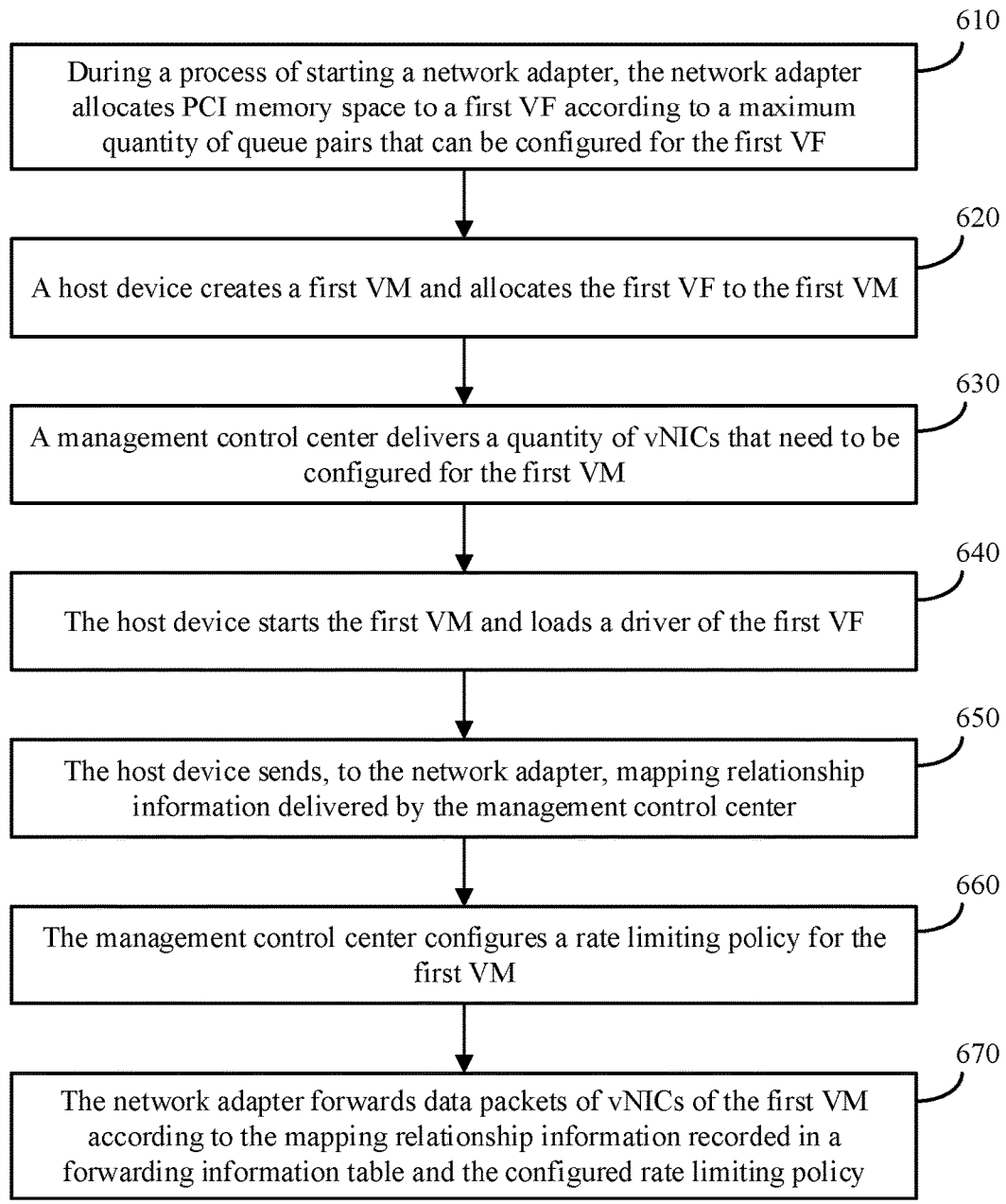
FIG. 6 is a flowchart of a data packet forwarding method according to an embodiment of the present disclosure.

The following describes this embodiment of the present disclosure in more detail with reference to specific examples. It should be noted that the example in FIG. 6 is provided merely for helping a person skilled in the art understand this embodiment of the present disclosure instead of confining this embodiment of the present disclosure to a specific value or a specific scenario shown in FIG. 6. Apparently, a person skilled in the art can make various equivalent modifications or variations according to the example in FIG. 6, and such modifications and variations shall also fall within the scope of this embodiment of the present disclosure. It should be understood that FIG. 6 illustrates an example in which the first VF is corresponding to all vNICs of the first VM, but this is not limited in this embodiment of the present disclosure and the first VF may be corresponding to some vNICs of the first VM.

FIG. 6 is a schematic flowchart of a data packet forwarding method according to an embodiment of the present disclosure.

610. During a process of starting a network adapter, the network adapter allocates PCI memory space (or referred to as BAR space) to a first VF according to a maximum quantity of queue pairs that can be configured for the first VF.

Specifically, step 610 may be performed by a PF of the network adapter.

The first VF may be any one VF of the network adapter. The maximum quantity of queue pairs that can be configured for the first VF may be a default value. The default value may be managed and maintained by, for example, a management subsystem of the network adapter. Therefore, the default value may be obtained from the management subsystem during startup of the network adapter. The following description assumes that a maximum of X queue pairs can be configured for the first VF.

The PCI memory space of the first VF may include X storage areas in a one-to-one correspondence to the X queue pairs. Each storage area is used to store control information of one queue pair. Control information of a queue pair may include a base address, a length, a head address, a tail address, and the like of the queue pair.

620. A host device creates a first VM and allocates the first VF to the first VM.

Step 620 may be specifically performed by a VMM on the host device. For example, in FIG. 1, a user (or an administrator) may operate the management control center 110, such that the virtualization layer 122 of the VMM 120 creates the first VM and allocates the first VF to the first VM.

630. A management control center delivers a quantity of vNICs that need to be configured for the first VM.

For example, in FIG. 1, the user may operate the management control center 110 to configure, by using the API module 121, the quantity of vNICs required by the first VM. The following description assumes that N vNICs need to be configured for the first VM, where N is a positive integer not greater than X. The API module 121 delivers first indication information to the management subsystem 141 of the network adapter 140, indicating that a quantity of queue pairs that need to be started for the first VF is N. The management subsystem 141 records the quantity of queue pairs that need to be started for the first VF and an identifier of the first VF.

640. The host device starts the first VM and loads a driver of the first VF.

Step 640 may be specifically performed by the VMM on the host device.

During a process of loading the driver of the first VF, the driver of the first VF interacts with the management subsystem to obtain a quantity of queue pairs started for the first VF. The driver of the first VF may create a same quantity of vNICs according to the quantity of queue pairs started for the first VF.

650. The host device sends, to the network adapter, mapping relationship information delivered by the management control center.

The mapping relationship information may be generated by the management control center, and delivered to the network adapter by using the host device (which may be specifically a driver of the first VM running on the host device). The mapping relationship information may include a mapping relationship among a MAC address and a VLAN identifier of each virtual network adapter corresponding to the first VF, a VF identifier, and a queue pair identifier (for details, refer to Table 1). The network adapter may record the mapping relationship information in a forwarding information table.

660. The management control center configures a rate limiting policy for the first VM.

It should be understood that a sequence of step 660 and steps 610 to 650 is not specifically limited in this embodiment of the present disclosure. For example, the rate limiting policy for the first VM may be configured before or after the first VM is started.

Specifically, as shown in FIG. 1, the user (or the administrator) may operate the management control center to deliver rate limiting policy information (indicating an overall rate limiting policy of the first VM) to the API module 121. The API module 121 may deliver the rate limiting policy information to the management subsystem 141 by using the PF driver 123. The management subsystem 141 stores the rate limiting policy information and limits, according to the rate limiting policy information, rates of traffic in a TX direction and an RX direction of the first VM respectively by using the TX rate limiting module 142 and the RX rate limiting module 143 of the network adapter 140.

A specific rate limiting manner may be implemented by using a token bucket technology or another technology, and is not specifically limited in this embodiment of the present disclosure.

In the prior art, one VF is corresponding to one vNIC, and therefore, the user can formulate a rate limiting policy specific to only one vNIC. In this embodiment of the present disclosure, a VF is corresponding to all vNICs of a VM, and therefore, the user can formulate a rate limiting policy specific to a VM. Table 2 is an example of a rate liming policy for a VM.

TABLE 2

Example of a rate liming policy for a VM

| VM identifier | Average bandwidth (TX) | Peak bandwidth (TX) | Burst traffic (TX) | Average bandwidth (RX) | Peak bandwidth (RX) | Burst bandwidth (RX) |
|---|---|---|---|---|---|---|
| 1 | 100 Mbps | 120 Mbps | 200 Mbits | 100 Mbps | 120 Mbps | 200 Mbits |
| 2 | 120 Mbps | 140 Mbps | 200 Mbits | 120 Mbps | 140 Mbps | 200 Mbits |

670. The network adapter forwards data packets of the vNICs of the first VM according to the mapping relationship information recorded in a forwarding information table and the configured rate limiting policy.

Step 670 may be specifically implemented by a forwarding module of the network adapter. The mapping relationship information may be recorded in a forwarding information table of the forwarding module. Regardless of whether a data packet is received from a network side or different VMs of a same host device, a corresponding queue pair may be found by querying for the mapping relationship information in the forwarding information table according to a MAC address and a VLAN identifier of a vNIC that are recorded in the data packet, and the data packet is sent to the vNIC that is of the first VM and that is corresponding to the queue pair. If no corresponding queue pair is found, the data packet may be broadcast.

According to this embodiment of the present disclosure, rate limiting can be performed on overall traffic of a VM. This helps a VM user balance traffic of vNICs of the VM. In addition, based on this embodiment of the present disclosure, a cloud provider can perform charging on the overall traffic of the VM. This enriches charging policies of the cloud provider.

The foregoing describes in detail, from a perspective of a network adapter, a data packet forwarding method according to the embodiments of the present disclosure with reference to FIG. 4 to FIG. 6. The following describes, from a perspective of a host device connected to the network adapter, a data packet forwarding method according to an embodiment of the present disclosure with reference to FIG. 7. It should be understood that descriptions of an interaction between the host device and the network adapter, and related features, functions, and the like that are described from the perspective of the host device side are similar to the descriptions given from the perspective of the network adapter side. For brevity, repeated descriptions are appropriately omitted.

Figure 7:
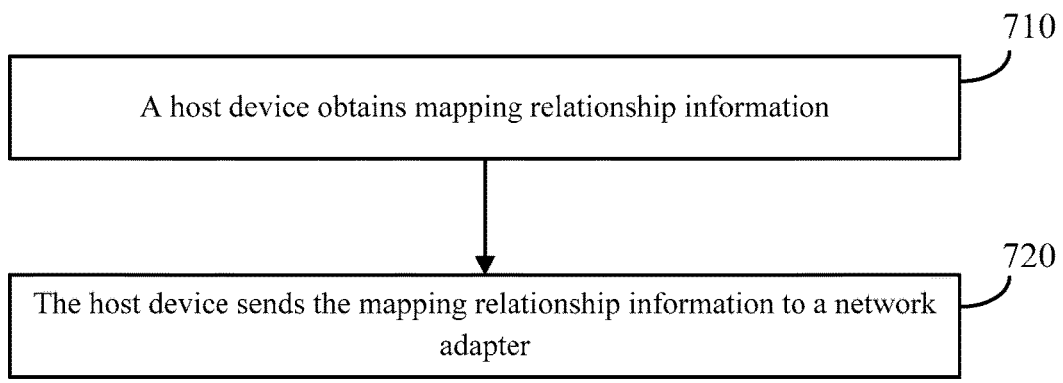
FIG. 7 is a schematic flowchart of a data packet forwarding method according to another embodiment of the present disclosure.

FIG. 7 is a schematic flowchart of a data packet forwarding method according to an embodiment of the present disclosure. The method in FIG. 7 may be applied to a host device. The host device is connected to a network adapter, the host device includes a first VM, the first VM includes N vNICs, and the network adapter includes a first VF allocated to the first VM, where N is an integer greater than 1.

The method in FIG. 7 includes the following steps.

710. The host device obtains mapping relationship information, where the mapping relationship information is used to indicate a one-to-one mapping relationship between N queue pairs among queues configured for the first VF and the N vNICs, and each of the N queue pairs is used to forward a data packet of a vNIC corresponding to each queue pair.

The mapping relationship information may be generated by the management control center 110 shown in FIG. 1. Step 710 may specifically include: obtaining the mapping relationship information from the management control center 110.

720. The host device sends the mapping relationship information to the network adapter, such that the network adapter records the mapping relationship information in a forwarding information table of the network adapter.

Optionally, in some embodiments, the mapping relationship information records an identifier of each of the N vNICs, an identifier of a VF corresponding to each vNIC, and an identifier of a queue pair corresponding to each vNIC.

Optionally, in some embodiments, the identifier of each of the N vNICs includes a MAC address and a VLAN identifier of each vNIC.

Optionally, in some embodiments, the method in FIG. 7 may further include: before the first VM is started, sending first indication information to the network adapter by using a PF driver of the network adapter, where the first indication information is used to indicate that a quantity of queue pairs that need to be started for the first VF is N; and during a process of starting the first VM, receiving second indication information sent to a driver of the first VF by the network adapter, where the second indication information is used to indicate that a quantity of queue pairs started for the first VF is N, so as to trigger the driver of the first VF to create N vNICs.

Optionally, in some embodiments, the method in FIG. 7 may further include: sending rate limiting policy information to the network adapter by using the PF driver of the network adapter, where the rate limiting policy information is used to indicate an overall rate limiting policy for the N vNICs of the first VM.

The following describes an apparatus embodiment of the present disclosure. Because the foregoing method may be performed in the apparatus embodiment, for parts that are not described in detail, refer to the foregoing method embodiments.

Figure 8:
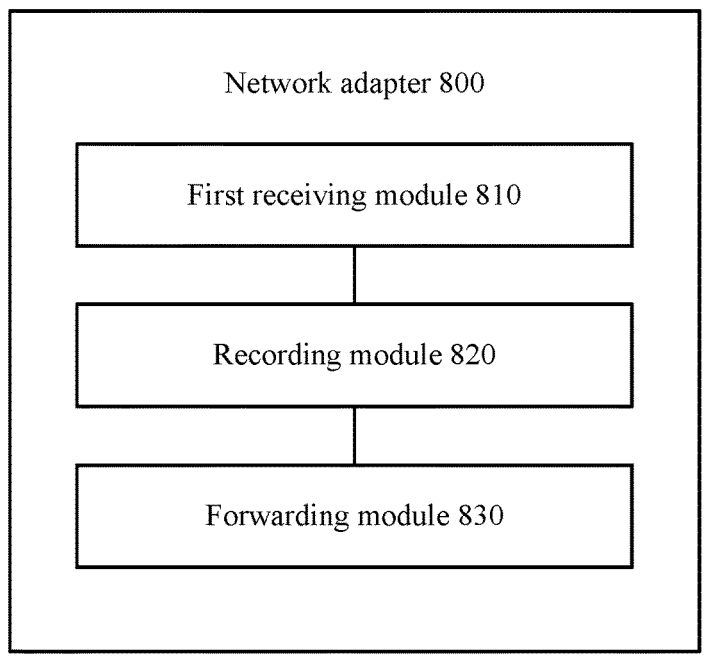
FIG. 8 is a schematic structural diagram of a network adapter according to an embodiment of the present disclosure.

FIG. 8 is a schematic structural diagram of a network adapter according to an embodiment of the present disclosure. A network adapter 800 in FIG. 8 is connected to a host device, the host device includes a first VM, the first VM includes N vNICs, and the network adapter 800 includes a first VF allocated to the first VM, where N is an integer greater than 1. The network adapter 800 includes:

a first receiving module 810, configured to receive mapping relationship information sent by the host device, where the mapping relationship information is used to indicate a one-to-one mapping relationship between N queue pairs among queues configured for the first VF and the N vNICs, and each of the N queue pairs is used to forward a data packet of a vNIC corresponding to each queue pair;

a recording module 820, configured to record the mapping relationship information in a forwarding information table of the network adapter 800; and a forwarding module 830, configured to forward data packets of the N vNICs according to the mapping relationship information recorded in the forwarding information table.

In this embodiment of the present disclosure, the one-to-one mapping relationship is established between the N queue pairs of the first VF and the N vNICs of the first VM, such that the data packets of the N vNICs are all forwarded by using queue pairs of the first VF. Because the network adapter allocates a bandwidth resource on a basis of a VF, the N vNICs can share a bandwidth resource of the first VF.

Optionally, in some embodiments, the mapping relationship information may record an identifier of each of the N vNICs, an identifier of a VF corresponding to each vNIC, and an identifier of a queue pair corresponding to each vNIC.

Optionally, in some embodiments, the forwarding module 830 may be specifically configured to: receive a first data packet, where the first data packet is a data packet sent to a first vNIC of the N vNICs, and the first data packet includes an identifier of the first vNIC; determine, by querying for the mapping relationship information in the forwarding information table according to the identifier of the first vNIC, a target receiving queue that is of the first VF and that is corresponding to the first vNIC; obtain control information of the target receiving queue from PCI memory space of the first VF; and send, according to the control information of the target receiving queue, the first data packet to the first vNIC by using the target receiving queue.

Optionally, in some embodiments, the identifier of each of the N vNICs may include a MAC address and a VLAN identifier of each vNIC.

Optionally, in some embodiments, the network adapter 800 may further include: a second receiving module, configured to receive first indication information from a PF driver of the network adapter 800 before the first VM is started, where the first indication information is used to indicate that a quantity of queue pairs that need to be started for the first VF is N; and a sending module, configured to send second indication information to a driver of the first VF during a process of starting the first VM, where the second indication information is used to indicate that a quantity of queue pairs started for the first VF is N, so as to trigger the driver of the first VF to create N vNICs.

Optionally, in some embodiments, the network adapter 800 may further include: a third receiving module, configured to receive rate limiting policy information from the PF driver of the network adapter 800, where the rate limiting policy information is used to indicate an overall rate limiting policy for the N vNICs of the first VM; and a configuration module, configured to configure, according to the overall rate limiting policy, a bandwidth resource corresponding to the first VF.

Figure 9:
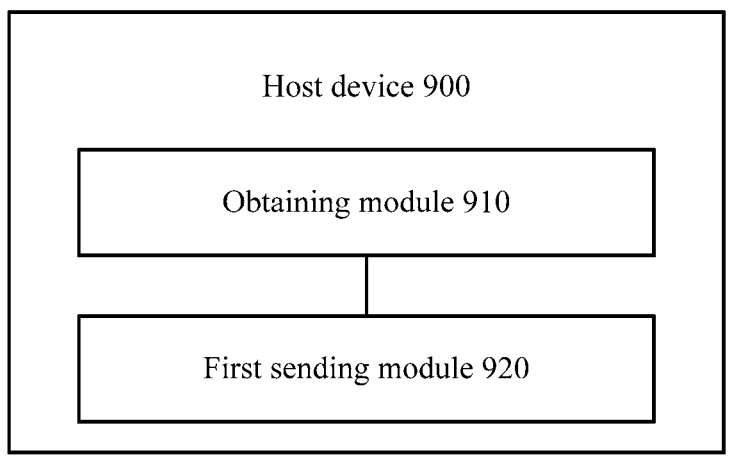
FIG. 9 is a schematic structural diagram of a host device according to an embodiment of the present disclosure.

FIG. 9 is a schematic structural diagram of a host device according to an embodiment of the present disclosure. A host device 900 in FIG. 9 is connected to a network adapter, the host device 900 includes a first VM, the first VM includes N vNICs, and the network adapter includes a first VF allocated to the first VM, where N is an integer greater than 1. The host device 900 includes:

an obtaining module 910, configured to obtain mapping relationship information, where the mapping relationship information is used to indicate a one-to-one mapping relationship between N queue pairs among queues configured for the first VF and the N vNICs, and each of the N queue pairs is used to forward a data packet of a vNIC corresponding to each queue pair; and a first sending module 920, configured to send the mapping relationship information to the network adapter, such that the network adapter records the mapping relationship information in a forwarding information table of the network adapter.

In this embodiment of the present disclosure, the one-to-one mapping relationship is established between the N queue pairs of the first VF and the N vNICs of the first VM, such that data packets of the N vNICs are all forwarded by using queue pairs of the first VF. Because the network adapter allocates a bandwidth resource on a basis of a VF, the N vNICs can share a bandwidth resource of the first VF.

Optionally, in some embodiments, the mapping relationship information may record an identifier of each of the N vNICs, an identifier of a VF corresponding to each vNIC, and an identifier of a queue pair corresponding to each vNIC.

Optionally, in some embodiments, the identifier of each of the N vNICs may include a MAC address and a VLAN identifier of each vNIC.

Optionally, in some embodiments, the host device 900 may further include: a second sending module, configured to: before the first VM is started, send first indication information to a PF driver of the network adapter, where the first indication information is used to indicate that a quantity of queue pairs that need to be started for the first VF is N; and a receiving module, configured to: during a process of starting the first VM, receive second indication information sent to a driver of the first VF by the network adapter, where the second indication information is used to indicate that a quantity of queue pairs started for the first VF is N, so as to trigger the driver of the first VF to create N vNICs.

Optionally, in some embodiments, the host device 900 may further include: a third sending module, configured to send rate limiting policy information to the network adapter by using the PF driver of the network adapter, where the rate limiting policy information is used to indicate an overall rate limiting policy for the N vNICs of the first VM.

Figure 10:
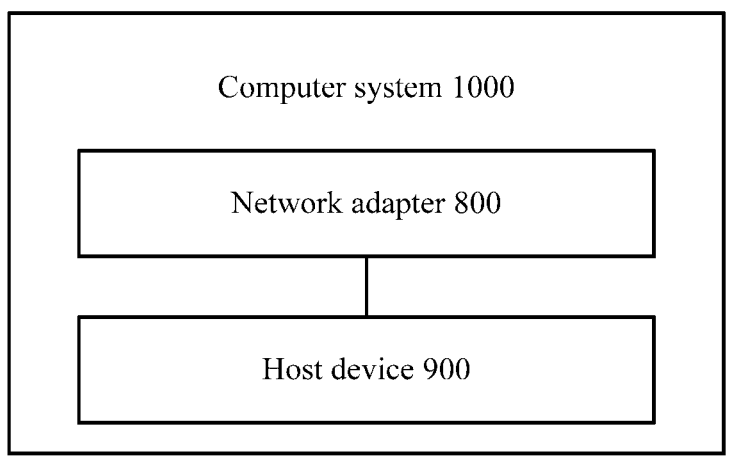
FIG. 10 is a schematic structural diagram of a computer system according to an embodiment of the present disclosure.

FIG. 10 is a schematic structural diagram of a computer system according to an embodiment of the present disclosure. A computer system 1000 in FIG. 10 includes the network adapter 800 shown in FIG. 8 and the host device 900 in FIG. 9.

Figure 11:
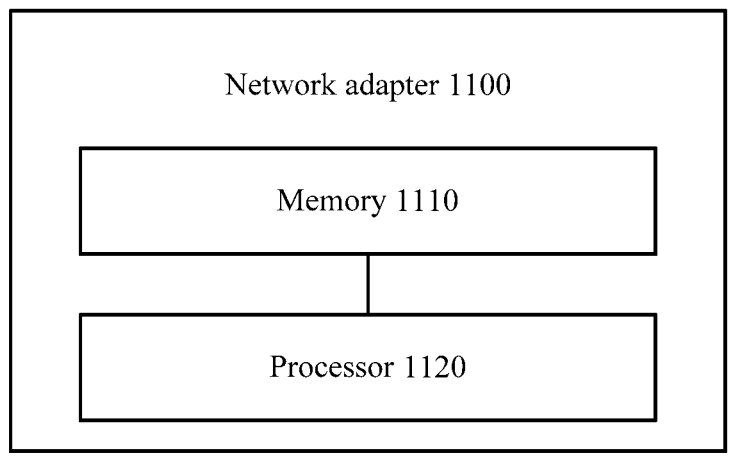
FIG. 11 is a schematic structural diagram of a network adapter according to another embodiment of the present disclosure.

FIG. 11 is a schematic structural diagram of a network adapter according to an embodiment of the present disclosure. A network adapter 1100 in FIG. 11 is connected to a host device, the host device includes a first VM, the first VM includes N vNICs, and the network adapter 1100 includes a first VF allocated to the first VM, where N is an integer greater than 1. The network adapter 1100 includes:

a memory 1110, configured to store program code; and a processor 1120, configured to execute the program code stored in the memory 1110, so as to perform the following operations:

receiving mapping relationship information sent by the host device, where the mapping relationship information is used to indicate a one-to-one mapping relationship between N queue pairs among queues configured for the first VF and the N vNICs, and each of the N queue pairs is used to forward a data packet of a vNIC corresponding to each queue pair;

recording the mapping relationship information in a forwarding information table of the network adapter 1100; and forwarding data packets of the N vNICs according to the mapping relationship information recorded in the forwarding information table.

In this embodiment of the present disclosure, the one-to-one mapping relationship is established between the N queue pairs of the first VF and the N vNICs of the first VM, such that the data packets of the N vNICs are all forwarded by using queue pairs of the first VF. Because the network adapter allocates a bandwidth resource on a basis of a VF, the N vNICs can share a bandwidth resource of the first VF.

Optionally, in some embodiments, the mapping relationship information may record an identifier of each of the N vNICs, an identifier of a VF corresponding to each vNIC, and an identifier of a queue pair corresponding to each vNIC.

Optionally, in some embodiments, the forwarding data packets of the N vNICs according to the mapping relationship information recorded in the forwarding information table may include: receiving a first data packet, where the first data packet is a data packet sent to a first vNIC of the N vNICs, and the first data packet includes an identifier of the first vNIC; determining, by querying for the mapping relationship information in the forwarding information table according to the identifier of the first vNIC, a target receiving queue that is of the first VF and that is corresponding to the first vNIC; obtaining control information of the target receiving queue from PCI memory space of the first VF; and sending, according to the control information of the target receiving queue, the first data packet to the first vNIC by using the target receiving queue.

Optionally, in some embodiments, the identifier of each of the N vNICs may include a MAC address and a VLAN identifier of each vNIC.

Optionally, in some embodiments, the processor 1120 may be further configured to perform the following operations: receiving first indication information from a PF driver of the network adapter 1100 before the first VM is started, where the first indication information is used to indicate that a quantity of queue pairs that need to be started for the first VF is N; and sending second indication information to a driver of the first VF during a process of starting the first VM, where the second indication information is used to indicate that a quantity of queue pairs started for the first VF is N, so as to trigger the driver of the first VF to create N vNICs.

Optionally, in some embodiments, the processor 1120 may be further configured to perform the following operations: receiving rate limiting policy information from the PF driver of the network adapter 1100, where the rate limiting policy information is used to indicate an overall rate limiting policy for the N vNICs of the first VM; and configuring, according to the overall rate limiting policy, a bandwidth resource corresponding to the first VF.

Figure 12:
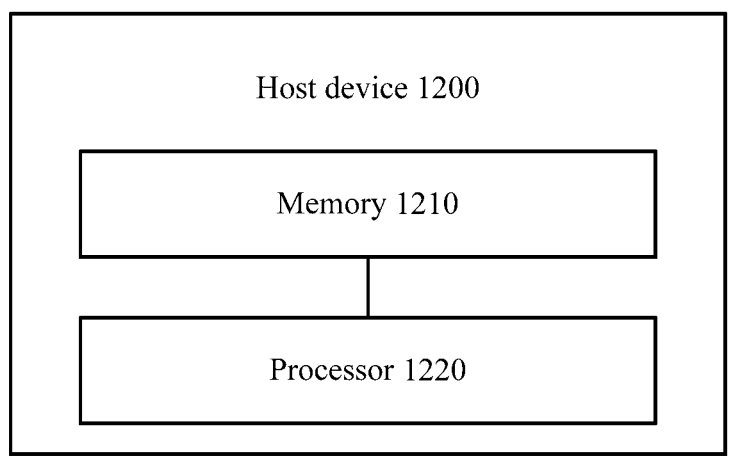
FIG. 12 is a schematic structural diagram of a host device according to another embodiment of the present disclosure.

FIG. 12 is a schematic structural diagram of a host device according to an embodiment of the present disclosure. A host device 1200 in FIG. 12 is connected to a network adapter, the host device 1200 includes a first VM, the first VM includes N vNICs, and the network adapter includes a first VF allocated to the first VM, where N is an integer greater than 1. The host device 1200 includes:

a memory 1210, configured to store program code; and a processor 1220, configured to execute the program code stored in the memory 1210, so as to perform the following operations:

obtaining mapping relationship information, where the mapping relationship information is used to indicate a one-to-one mapping relationship between N queue pairs among queues configured for the first VF and the N vNICs, and each of the N queue pairs is used to forward a data packet of a vNIC corresponding to each queue pair; and sending the mapping relationship information to the network adapter, such that the network adapter records the mapping relationship information in a forwarding information table of the network adapter.

In this embodiment of the present disclosure, the one-to-one mapping relationship is established between the N queue pairs of the first VF and the N vNICs of the first VM, such that data packets of the N vNICs are all forwarded by using queue pairs of the first VF. Because the network adapter allocates a bandwidth resource on a basis of a VF, the N vNICs can share a bandwidth resource of the first VF.

Optionally, in some embodiments, the mapping relationship information may record an identifier of each of the N vNICs, an identifier of a VF corresponding to each vNIC, and an identifier of a queue pair corresponding to each vNIC.

Optionally, in some embodiments, the identifier of each of the N vNICs may include a MAC address and a VLAN identifier of each vNIC.

Optionally, in some embodiments, the processor 1220 may be further configured to perform the following operations: before the first VM is started, sending first indication information to the network adapter by using a physical function PF driver of the network adapter, where the first indication information is used to indicate that a quantity of queue pairs that need to be started for the first VF is N; and during a process of starting the first VM, receiving second indication information sent to a driver of the first VF by the network adapter, where the second indication information is used to indicate that a quantity of queue pairs started for the first VF is N, so as to trigger the driver of the first VF to create N vNICs.

Optionally, in some embodiments, the processor 1220 may be further configured to perform the following operation: sending rate limiting policy information to the network adapter by using the PF driver of the network adapter, where the rate limiting policy information is used to indicate an overall rate limiting policy for the N vNICs of the first VM.

Figure 13:
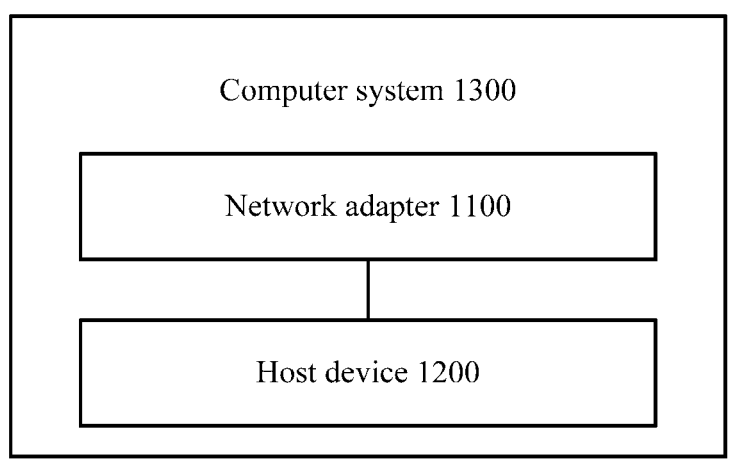
FIG. 13 is a schematic structural diagram of a computer system according to another embodiment of the present disclosure.

FIG. 13 is a schematic structural diagram of a computer system according to an embodiment of the present disclosure. A computer system 1300 in FIG. 13 includes the network adapter 1100 in FIG. 11 and the host device 1200 in FIG. 12.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

What is claimed is:

1. A data packet forwarding method, comprising:
receiving, by a network adapter, mapping relationship information sent by a host device, wherein the network adapter is connected to the host device, the host device comprises a first virtual machine (VM), the first VM comprises N virtual network interface cards (vNICs), and the network adapter comprises a first virtual function (VF) allocated to the first VM, wherein N is an integer greater than 1, wherein the mapping relationship information is used to indicate a one-to-one mapping relationship between N queue pairs among queues configured for the first VF and the N vNICs, and each of the N queue pairs is used to forward a data packet of a vNIC corresponding to the queue pair;
recording, by the network adapter, the mapping relationship information in a forwarding information table; and
forwarding, by the network adapter, data packets of the N vNICs according to the mapping relationship information recorded in the forwarding information table.

2. The method according to claim 1, wherein the mapping relationship information records an identifier of each of the N vNICs, an identifier of a VF corresponding to each vNIC, and an identifier of a queue pair corresponding to each vNIC.

3. The method according to claim 2, wherein forwarding the data packets of the N vNICs comprises:
receiving a first data packet, wherein the first data packet is a data packet sent to a first vNIC of the N vNICs, and the first data packet comprises an identifier of the first vNIC;
determining, by querying for the mapping relationship information in the forwarding information table according to the identifier of the first vNIC, a target receiving queue that is of the first VF and that is corresponding to the first vNIC;
obtaining control information of the target receiving queue from PCI memory space of the first VF; and
sending, according to the control information of the target receiving queue, the first data packet to the first vNIC by using the target receiving queue.

4. The method according to claim 2, wherein the identifier of each of the N vNICs comprises a Media Access Control (MAC) address and a virtual local area network (VLAN) identifier of each vNIC.

5. The method according to claim 1, further comprising:
receiving first indication information from a physical function (PF) driver of the network adapter before the first VM is started, wherein the first indication information indicates that a quantity of queue pairs that need to be started for the first VF is N; and
sending second indication information to a driver of the first VF during a process of starting the first VM, wherein the second indication information indicates that a quantity of queue pairs started for the first VF is N, so as to trigger the driver of the first VF to create N vNICs.

6. The method according to claim 1, further comprising:
receiving rate limiting policy information from a physical function (PF) driver of the network adapter, wherein the rate limiting policy information is used to indicate an overall rate limiting policy for the N vNICs of the first VM; and
configuring, according to the overall rate limiting policy, a bandwidth resource corresponding to the first VF.

7. A network adapter, comprising:
a memory storing program code; and
a processor configured to execute the program code stored in the memory so as to cause the network adapter to perform the following operations:
receive mapping relationship information sent by a host device, wherein the network adapter is connected to the host device, the host device comprises a first virtual machine (VM), the first VM comprises N virtual network interface cards (vNICs), and the network adapter comprises a first virtual function (VF) allocated to the first VM, wherein N is an integer greater than 1, wherein the mapping relationship information is used to indicate a one-to-one mapping relationship between N queue pairs among queues configured for the first VF and the N vNICs, and each of the N queue pairs is used to forward a data packet of a vNIC corresponding to the queue pair;

record the mapping relationship information in a forwarding information table; and forward data packets of the N vNICs according to the mapping relationship information recorded in the forwarding information table.

8. The network adapter according to claim 7, wherein the mapping relationship information records an identifier of each of the N vNICs, an identifier of a VF corresponding to each vNIC, and an identifier of a queue pair corresponding to each vNIC.

9. The network adapter according to claim 8, wherein the processor is further configured to execute the program code stored in the memory so as to cause the network adapter to perform the following operations:

receive a first data packet, wherein the first data packet is a data packet sent to a first vNIC of the N vNICs, and the first data packet comprises an identifier of the first vNIC;

determine, by querying for the mapping relationship information in the forwarding information table according to the identifier of the first vNIC, a target receiving queue that is of the first VF and that is corresponding to the first vNIC;

obtain control information of the target receiving queue from PCI memory space of the first VF; and send, according to the control information of the target receiving queue, the first data packet to the first vNIC by using the target receiving queue.

10. The network adapter according to claim 8, wherein the identifier of each of the N vNICs comprises a Media Access Control (MAC) address and a virtual local area network (VLAN) identifier of each vNIC.

11. The network adapter according to claim 7, wherein the processor is further configured to execute the program code stored in the memory so as to cause the network adapter to perform the following operations:

receive first indication information from a physical function (PF) driver of the network adapter before the first VM is started, wherein the first indication information is used to indicate that a quantity of queue pairs that need to be started for the first VF is N; and send second indication information to a driver of the first VF during a process of starting the first VM, wherein the second indication information is used to indicate that a quantity of queue pairs started for the first VF is N, so as to trigger the driver of the first VF to create N vNICs.

12. The network adapter according to claim 7, wherein the processor is further configured to execute the program code stored in the memory so as to cause the network adapter to perform the following operations:

receive rate limiting policy information from a physical function (PF) driver of the network adapter, wherein the rate limiting policy information is used to indicate an overall rate limiting policy for the N vNICs of the first VM; and configure, according to the overall rate limiting policy, a bandwidth resource corresponding to the first VF.

13. A host device, comprising:

a memory configured to store program code; and a processor configured to execute the program code stored in the memory so as to cause the host device to perform the following operations:

obtain mapping relationship information, wherein the host device is connected to a network adapter, the host device comprises a first virtual machine (VM), the first VM comprises N virtual network interface cards (vNICs), and the network adapter comprises a first virtual function (VF) allocated to the first VM, wherein N is an integer greater than 1, wherein the mapping relationship information is used to indicate a one-to-one mapping relationship between N queue pairs among queues configured for the first VF and the N vNICs, and each of the N queue pairs is used to forward a data packet of a vNIC corresponding to the queue pair; and send the mapping relationship information to the network adapter, such that the network adapter records the mapping relationship information in a forwarding information table.

14. The host device according to claim 13, wherein the mapping relationship information records an identifier of each of the N vNICs, an identifier of a VF corresponding to each vNIC, and an identifier of a queue pair corresponding to each vNIC.

15. The host device according to claim 14, wherein the identifier of each of the N vNICs comprises a Media Access Control (MAC) address and a virtual local area network (VLAN) identifier of each vNIC.

16. The host device according to claim 13, wherein the processor is further configured to execute the program code stored in the memory so as to cause the host device to perform the following operations:

before the first VM is started, send first indication information to the network adapter by using a physical function (PF) driver of the network adapter, wherein the first indication information is used to indicate that a quantity of queue pairs that need to be started for the first VF is N; and during a process of starting the first VM, receive second indication information sent to a driver of the first VF by the network adapter, wherein the second indication information is used to indicate that a quantity of queue pairs started for the first VF is N, so as to trigger the driver of the first VF to create N vNICs.

17. The host device according to claim 13, wherein the processor is further configured to execute the program code stored in the memory so as to cause the host device to perform the following operations:

send rate limiting policy information to the network adapter by using a physical function (PF) driver of the network adapter, wherein the rate limiting policy information is used to indicate an overall rate limiting policy for the N vNICs of the first VM.

* * * * *